United States Patent [19]
Lapeyre

[11] 3,952,311
[45] Apr. 20, 1976

[54] ELECTRO-OPTICAL PRINTING SYSTEM

[75] Inventor: James M. Lapeyre, New Orleans, La.

[73] Assignee: The Laitram Corporation, New Orleans, La.

[22] Filed: Apr. 24, 1972

[21] Appl. No.: 246,555

[52] U.S. Cl. ............................... 354/5; 346/107 R; 354/4
[51] Int. Cl.² .................. B41B 13/00; G03B 41/00
[58] Field of Search ............... 178/6.6, 6.7, 7, 7.4, 178/15; 340/173, 324, 378; 95/4.5; 354/4, 5; 346/107 R

[56] References Cited
UNITED STATES PATENTS

| | | | |
|---|---|---|---|
| 2,899,673 | 8/1959 | Reiner | 340/173 |
| 2,982,175 | 5/1961 | Eisler | 95/4.5 |
| 3,008,372 | 11/1961 | Willey | 95/4.5 |
| 3,090,828 | 5/1963 | Bain | 178/6.6 |

*Primary Examiner*—John F. Gonzales
*Attorney, Agent, or Firm*—Schiller & Pandiscio

[57] ABSTRACT

A high speed, electro-optical printing system for producing images, particularly images of type characters, on sheet material. A radiation sensitive, image-recording material preferably in sheet form is moved at a controlled speed past an array of relatively small, emitters of radiation actinic to the image-recording material. The emitters are electrically energized selectively and for varying durations to expose and produce images in the image-recording material as it moves past the emitters.

The emitters may include light or heat emitting diodes or the ends of optical fibers each optically coupled at its other end with an actinic radiation source. The image-recording medium is carried on a sheet material and the system includes means for moving the image-recording sheet past the array of emitters and a processor for treating the exposed sheet to form a stable, visible image. A computer control system may include a memory containing programs for type characters thus offering the system utility as a high speed printer or it may provide for converting into printed form, electrical signals conveying graphic information.

2 Claims, 5 Drawing Figures

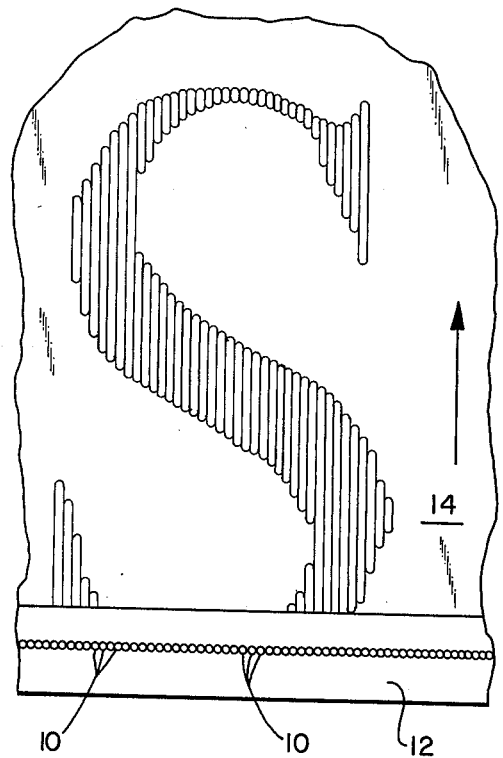
FIG. 1
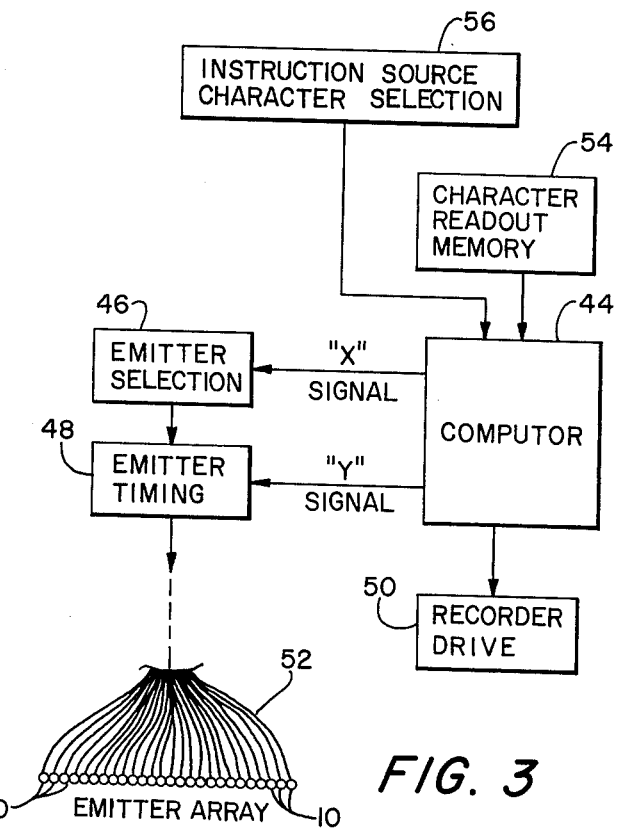
FIG. 3
FIG. 4A
FIG. 4B
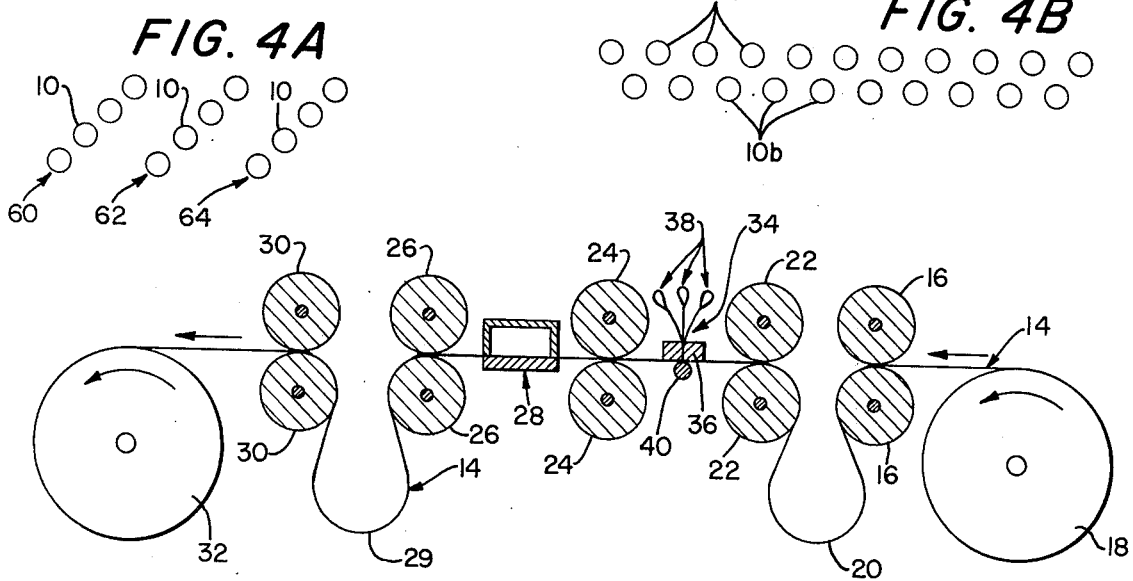
FIG. 2

ELECTRO-OPTICAL PRINTING SYSTEM

BACKGROUND OF THE INVENTION

This invention relates to high speed, electro-optical printing systems and particularly to systems employing radiation-sensitive image-recording mediums to produce records of information as type characters and/or in graphic form.

PRIOR ART

A number of systems have been proposed for utilizing electromagnetic radiation ranging from the ultraviolet to infrared for reproducing type characters. In many of these, a photosensitive image-recording medium is exposed to a light image of each particular character. In other systems, particularly those in which the recording material is moved continuously rather than intermittently, complex optical systems are employed to hold the image stationary relative to the recording medium while in others, a scanning beam of light is employed to write the desired image. Each of these systems is limited to its writing speed, as are mechanical impact systems, by the necessity for physically moving at least some component of the system other than the recording medium and/or moving components such as the recording medium intermittently rather than continuously.

Photographic image-forming systems including image-recording materials sensitive to actinic electromagnetic radiation, usually in the ultraviolet to infrared region, and methods of chemically treating the exposed materials to produce an image that is both visible and stable, are numerous and well known in the art. These include highly sensitive photochemical systems many of which utilize silver halides as the photo-sensitive recording medium, relatively less expensive systems of the photochemical type employing high contrast materials such as diazo compounds, and physical imaging systems employing photoelectric materials and effects such as Xerography, photo-electrophoretics, and the like.

BRIEF DESCRIPTION OF THE INVENTION

An object of the present invention is to provide a high speed electro-optical printing system and a method of printing employing a radiation sensitive, image-recording medium and an electrically controlled and energized source of actinic radiation for exposing the recording medium to produce images therein.

Another object of the invention is to provide a printing system of the type described capable of reproducing from electrical signals, graphic information in substantially any form such as type characters, half-tone photographs, line images, and the like.

These and other objects of the invention are realized in a novel and improved photo-optical system in which the only moving component is the recording medium which moves continuously during exposure to actinic radiation, thereby providing for high speed recording. The system is designed to irradiate selected portions of a moving recording medium utilizing an array of optical fibers, each of which is optically connected to a separate radiation emitter and thereby, in effect "paint" an image on the recording medium. The operation including selection, sequencing and energization of the emitters is achieved entirely electrically utilizing computor controls so that both high speed and versatility are provided.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 1 is an enlarged view illustrating somewhat schematically, the formation of a type character by the apparatus of the invention;

FIG. 2 is a somewhat schematic, elevational view, partially in section, illustrating the apparatus of the invention;

FIG. 3 is a schematic diagram of the control system of the invention; and

FIGS. 4A and 4B illustrate other emitter arrays.

DESCRIPTION OF THE INVENTION

As previously noted, the apparatus of the invention is designed to "paint" an image on a moving radiation-sensitive, image-recording medium utilizing a fixed array of actinic radiation emitters positioned to expose the recording medium. The formation of a type character by this system is illustrated in FIG. 1 of the drawings. A multiplicity of radiation emitters designated 10, are arranged in contiguous relation in a linear array mounted on a suitable support 12. The emitters 10 are located in a position to irradiate or "expose" a radiation sensitive, image-recording medium 14 moving in a direction substantially perpendicular to the linear array. Thus each emitter, when energized, will expose a linear region of the image-recording medium, the length of the line being a function of the linear speed of the recording medium and the duration of the energization period. Thus by energizing selected emitters for predetermined times, it is possible to expose an area of any shape or dimension within the limits of the resolution of the emitters. FIG. 1 illustrates the formation of the upper case letter "S."

The image-forming system illustrated in FIG. 1 can be employed, for example, as a high speed computor print out or printer designed to print standard type characters including alphanumeric characters as well as punctuation and mathematical symbols and the like. The actual size of the characters may be conventional, that is, corresponding to that of an ordinary typewriter and with type fonts typically employed therein. This can be accomplished by employing a large number of minute light emitters, the size of each emitter depending upon the resolution desired. For most line copy (as opposed to continuous tone) such as type characters produced by mechanical systems, acceptable resolutions in terms of well defined edges and substantially indistinguishable from mechanically formed characters, can be achieved by employing on the order of 300 emitters per inch. Of course less well defined resolution acceptable for most purposes, can be obtained with fewer emitters per linear dimension.

A radiation emitter, defined as a source of radiation capable of uniformly illuminating a discrete area of a surface located closely adjacent thereto, may take a number of different forms. Regardless of the form or construction however, such emitter is designed to be electrically energized and particularly for high speed applications, shall have a very fast response time with high "efficiency" such that the intensity versus time curve is characterized by rectangular peaks. Emitters with relatively long build-up times and decay rates will limit both the printing speed and image resolution as well as high speed applications.

One example of a suitable emitter is a minute, light-emitting diode, a multiplicity of which can be mounted on a suitable support in contiguous, linear relation. Where minimum diode size limitations do not permit the desired resolution, optical means may be employed to collect and focus the light from each diode and two or more adjacent linear arrays of diodes may be employed with the diodes of each array located with respect to the recording medium intermediate the diodes of the other array. A simple optical focusing system for such an arrangement would be an elongated cylindrical lens.

Another form of optical system which may be used to advantage both to provide very fine resolution as well as higher light intensities, incorporates light-conducting optical fibers. As is well known, these are very fine fibers, usually formed of glass, having surfaces designed to provide for total internal light reflection such that the fiber functions as light pipe and light introduced at one end emerges from the other end substantially undiminished in intensity except for absorption by the light-transmitting material of the fiber. The exit or emitting ends of the fibers, which can be extremely small, can be embedded in a suitable support with the entrance end of each fiber associated with a radiation source such as a light-emitting diode.

In addition to the advantage of smaller size, closer packing and hence finer resolution, light conducting fibers provide the further advantage that they provide for the use of a variety of types and sizes of radiation sources as well as associated optics for collecting and focusing the radiation from the sources. To achieve a more intense emitter, for example, the radiation from a relatively large source may be focused on the entrance end of a fiber and/or the fiber itself may be tapered from a relatively large entrance to a relatively small exit end. Other forms of radiation sources such as gaseous discharge lamps (strobe lamps) and spark emitters may be employed in conjunction with optical fiber arrays.

A typical printing system constructed in accordance with the invention is illustrated schematically in FIG. 2. This system is designed to employ a photosensitive, image-recording medium of a conventional type available in the form of an elongated sheet or strip 14. The system includes a first pair of feed rolls 16 for withdrawing sheet 14 from a supply (roll) 18 and feeding it into a take-up loop 20. A second pair of feed rolls 22 cooperate with a third pair 24 for advancing sheet 14 from loop 20 at a controlled rate past an array 34 of radiation (light) emitters. A fourth pair of rollers 26 advance the sheet through a processor designated 28 and into a take-up loop 29. Rollers 30 control the feeding of the sheet from loop 29 onto a take-up spool 32 or to other means for storing the print-bearing sheet 14.

The radiation emitter array, generally designated 34, is illustrated as a multiplicity of optical fibers embedded in a support 36 and each coupled with a radiation source 38. A guide and back-up roller 40 is provided for supporting sheet 14 against support 36 in alignment with the ends of the fibers embedded therein.

As previously noted, the processor 28 is shown schematically inasmuch as its particular structure will depend upon the particular recording medium employed and the method of forming and/or stabilizing a visible image therein. In FIG. 2, the processor is shown as a chamber through which a chemical reagent in liquid, vapor or gaseous form can be circulated in contact with the recording medium as the latter is moved through the chamber.

As previously noted, the image-recording sheet may be of a conventional type such as well known and widely used in the photographic and photoreproduction arts. In general, for the applications described the recording material should be of the high contrast type designed for line copy rather than for continuous tone copy, and may be selected for one or more particular properties including sensitivity (speed), ease and/or rapidity of processing to produce a stable image, cost, and the like. For every high speed printing, highly sensitive materials such as silver halides may be employed while the processor 28 will include conventional means for developing and fixing the latent image formed by exposure.

Suitable conventional image-recording materials are available in sheet form, i.e., coated on paper, which may be processed to form stable images in a number of ways, including the use of chemicals in liquid, gaseous or vapor form, or by other means including the application of heat. Other known recording media are adapted to form a visible image directly upon exposure and further processing is required for stabilizing the image.

An alternative image-forming method utilizing the system of the invention is to expose the radiation sensitive medium in regions where no image is desired and leave unexposed, these regions where the image is desired. In the conventional photographic sense, this corresponds to forming a "negative" image. To form the latter "S" as illustrated in FIG. 1, all of the light emitters would be energized and selected emitters would be deenergized as required to form an unexposed region corresponding to the character.

A "negative" exposure system such as described above could be used to advantage in a number of image-forming processes, particularly those which produce a direct positive, i.e. density where no exposure occurs, and are employed in conventional photocopying techniques. For example, it would enable the production of a print by electrostatic processes such as xerography, in which an electrostatic charge is formed on a photoconductor. When the photoconductor is exposed, the charge is conducted away in exposed areas leaving an electrostatic image that can be "developed" employing appropriately charged particles attracted to the charged regions. The possibilities and advantages of such a process and its ability to form an image on ordinary paper should be apparent to those skilled in the art.

The printing system of the invention has the advantage of speed resulting from the fact that the image-forming, radiation emitters are electrically energized and react very rapidly. To implement this advantage as well as to operate the emitters and the means for moving the recording medium, a computor control system such as illustrated schematically in FIG. 3, is employed. The main component of the system is a computer 44 programmed to provide X-signals which are applied to emitter selection means 46 to select the emitters to be energized, and Y-signals which are applied to emitter timing means 48 to determine the duration of emitter energization. The computer also is programmed to provide simultaneously a control signal to a recorder drive 50 to control the linear speed of the recording medium relative to the emitters in the Y-direction. The emitter selection and timing means are coupled via appropriate conductors 52 to the individual emitters 10 so that the latters are controlled in accordance with the aforesaid X- and Y-signals. The input or instructions to the computer may take the form of a character readout memory 54 in which is stored a program for each character or symbol to be included within the printer capability. Thus, to print a particular character, the computer is instructed by means of a character selection unit 56 to address the program for that particular character. In an embodiment in which the printer is intended to print a line of characters simultaneously, it may include a second readin-readout memory for temporarily storing the character programs for an entire line of characters.

While the printer of the invention has been described with particular regard to its utility as a character printer, it is obviously capable of reproducing graphic information in other forms such as half-tone photographs, line drawings, or the like. In such applications, the source of instructions to the computer can be a memory or, if it is desired to reproduce matter already in printed form, then an electro-optical scanning device such as a conventional television camera may be employed. In this latter example, the computer could be programmed to convert the television signals into instructions for emitter selection and energization timing.

The specific operation of the computer and the programs involved have not been discussed in detail because they are within the capabilities of conventional computers and persons skilled in the computer art. Essentially, the program for a particular character will, as previously noted, specify which emitters are to be energized at any particular time segment during which the recording medium is moved a predetermined distance. When used to print other forms of graphic information, the computor is programmed to receive and respond to electrical signals conveying the information in such a way as to form images where required.

While the printer has been described as being designed primarily to produce line copy, other embodiments are possible which provide it with at least a limited continuous tone capability. For example, the printer can be provided with several linear arrays of emitters aligned in the Y-direction of motion of the recording medium. The arrangement may be such that each linear increment of the recording medium can be exposed by a selected number of emitters in sequence. In this application the recording medium would be a type having continuous tone capability and the number of steps in the "grey scale" which could be produced by the printer would depend upon the number of linear arrays of radiation-emitters. A 10-step gray scale capability with high resolution (small) emitters could provide an aesthetically pleasing, continuous tone print.

As an alternative, the recording medium can be moved at a relatively slower speed such that each emitter can be flashed or "strobed" a selected number of times to expose a particular region to the radiant energy required to provide a predetermined density. Both this and the aforementioned system (with fewer linear arrays) may be employed in combination to produce substantially continuous tone prints, further contributing to the versatility and utility of the novel printing system of the invention.

Although the embodiments of FIGS. 1–3 utilize a linear array of contiguous emitters with the array extending transversely of the direction of movement of the image recording medium, it is contemplated that emitters (or the exit ends of the light-conducting optical fibers, if used) may be arranged in other forms of arrays. Thus, as shown in FIG. 4A, the emitters 10 (or the exit ends of the optical fibers) may be arranged in parallel spaced rows 60, 62, 64 that extend at an acute angle to the direction of movement of the image recording medium, with the spacing in each row and the disposition of the rows being such that by appropriate sequential energization of emitters it is possible, for example, to record the image of a straight line that extends at a right angle to the direction of movement of the recording medium; i.e., the same as if the contiguous emitters 10 of FIG. 1 were simultaneously energized by a short duration pulse. This may be achieved by briefly energizing the first emitters in the several rows simultaneously and repeating the process for successive emitters in the several rows. If, the speed at which successive emitters are switched on and off is properly adjusted relative to the speed of movement of the recording medium, the image recorded in the recording medium will be a straight line as desired.

The number of emitters in each inclined row and the number of inclined rows may be varied as desired. Thus it is possible to replace the three rows of emitters shown in FIG. 4A with a single row of emitters that extends at an acute angle to the direction of movement of the recording medium.

Alternatively the emitters may be arranged in an array as shown in FIG. 4B, the array consisting of two (or more) parallel linear rows of emitters 10a and 10b with the emitters in one row being staggered with respect to the emitters in the adjacent row. If the spacing between adjacent emitters in each row is just equal to what would be required to insert another emitter between them and if the emitters of the two rows are energized sequentially left to right (or vice versa) but in alternating fashion, i.e., first one in one row and then one in the other row, and if also the rate at which they are switched is appropriately related to the speed of movement of the recording medium, it is possible to record the image of a continuous straight line extending transversely of the recording medium.

Obviously the emitters of the arrangements of FIGS. 4A and 4B also may be selectively energized to form other two-dimensional images, e.g. alpha-numeric characters or other symbols as contemplated by this invention.

It is to be understood also that even in a linear array (FIG. 1) the emitters (or the exit ends of the light-conducting fibers) need not be contiguous. In fact it may be desireable to have a selected degree of spacing between them to minimize "cross-talk" due to light dispersion or other factors. The arrangements of FIGS. 4A and 4B not only minimize cross-talk but also offer the advantage of permitting the use of larger diameter emitters or light conducting fibers and, especially in the case of miniature discrete light emitting diodes, of allowing more access room for connecting wire leads.

It also is contemplated that the recording medium may be of the thermographic type, in which case the emitters may be adapted to "burn" an image in the recording medium by high intensity radiation.

Since certain changes may be made in the above apparatus wiithout departing from the scope of the invention herein involved, it is intended that all matter contained in the above description or shown in the accompanying drawings shall be interpreted as illustrative and not in a limiting sense.

What is claimed is;

1. An electro-optical printing apparatus for printing alpha-numeric characters on a surface of a photosensitive recording material, said apparatus comprising:

a plurality of radiation emitters each being capable of emitting radiation at wavelengths to which said surface is sensitive, said emitters being disposed in an array along a substantially straight line, said array being a plurality of rows of said radiation emitters;

means for moving said recording material with its surface adjacent said array, and at a substantially constant speed relative to said array, and;

means for selectively activating each of the said emitters for predetermined periods of time, and means for coordinating the predetermined periods of time in which each of the said plurality of emitters are activated with said constant relative speed of said recording material so that the radiation emitted by said emitters will be recorded on selected areas of said recording surface in the form of an alpha-numeric image, each of the said emitters being positioned to irradiate a different area of said recording surface, the different areas of said surface irradiated by each of the said emitters being arranged in an overlapping relationship with one another.

2. A method of electro-optically printing alpha-numeric characters on the recording surface of a photosensitive material, said method comprising the steps of:

arranging a plurality of radiation emitters in a straight line array, each of the said emitters being capable of emitting radiation at wavelengths to which said photosensitive material is sensitive, selectively energizing for predetermined periods of time each of the said emitters, transmitting the emitted radiation from each of the said emitters to a different area on said surface, providing relative movement at substantially constant speed between said recording surface and said emitters, and coordinating the predetermined periods of time in which each of said plurality of emitters are selectively energized with said constant speed of said relative movement between said emitters and recording surface so that alpha-numeric character images are recorded on said recording surface by exposure of selected ares of said recording surface by said emitted radiation, said step of coordinating including the steps of synchronously generating a first data signal which programs the order to energization of said emitters and a second data signal which determines the duration of the energization period of said emitters, and employing said first and second data signals to effect energization of said emitters so as to record said alpha-numeric character images.

\* \* \* \* \*

REEXAMINATION CERTIFICATE (1225th)
United States Patent [19]

Lapeyre

[11] B1 3,952,311

[45] Certificate Issued Mar. 27, 1990

[54] ELECTRO-OPTICAL PRINTING SYSTEM

[75] Inventor: James M. Lapeyre, New Orleans, La.

[73] Assignee: Laitram Corp., New Orleans, La.

Reexamination Request:
No. 90/001,732, Mar. 22, 1989

Reexamination Certificate for:
Patent No.: 3,952,311
Issued: Apr. 20, 1976
Appl. No.: 246,555
Filed: Apr. 24, 1972

[51] Int. Cl.⁴ .................. B41B 13/00; G03B 41/00
[52] U.S. Cl. .................................. 354/5; 346/107 R; 354/4

[56] References Cited

U.S. PATENT DOCUMENTS

| | | | |
|---|---|---|---|
| 2,899,673 | 8/1959 | Reiner | 340/173 |
| 2,982,175 | 5/1961 | Eisler | 95/4.5 |
| 2,997,361 | 8/1961 | Christopherson et al. | 346/74 |
| 3,008,372 | 11/1961 | Willey et al. | 88/24 |
| 3,085,132 | 4/1963 | Innes | 178/30 |
| 3,090,528 | 5/1963 | Bain | 175/6.6 |
| 3,109,058 | 10/1963 | Luhn . | |
| 3,130,411 | 4/1964 | Schwertz . | |
| 3,157,456 | 11/1964 | Kikuchi | 346/78 |
| 3,182,308 | 5/1965 | Dutton et al. . | |
| 3,287,736 | 11/1966 | Germer . | |
| 3,416,153 | 12/1968 | Hertz et al. . | |
| 3,419,886 | 12/1968 | Ortlieb | 346/74 |
| 3,430,256 | 2/1969 | Goodman . | |
| 3,438,057 | 4/1969 | Nietzel | 346/107 |
| 3,508,002 | 4/1970 | Hauer . | |
| 3,512,158 | 5/1970 | Scarbrough | 346/76 |
| 3,517,592 | 6/1970 | Kollar . | |
| 3,624,661 | 11/1971 | Shebanow et al. . | |
| 3,644,922 | 2/1972 | James et al. . | |
| 3,651,258 | 3/1972 | Ammann . | |
| 3,832,488 | 8/1974 | Fahey et al. . | |
| 3,850,517 | 11/1974 | Stephany et al. . | |

FOREIGN PATENT DOCUMENTS

46-41357  12/1971  Japan .
1201624  8/1970  United Kingdom .

OTHER PUBLICATIONS

ECMA, Alpha–Numeric Character Set for 7×9 Matrix Printers, Dec. 1973, George J. Waas, Optical Printer System, Aug. 1965.
T. J. Harris, Optical Printer, vol. 13, No. 12, May 1971.

*Primary Examiner*—Michoel L. Gellner

[57] ABSTRACT

A high speed electro-optical printing system for producing images, particularly images of type characters, on sheet material. A radiation sensitive, image-recording material preferably in sheet form is moved at a controlled speed past an arrary of relatively small, emitters of radiation actinic to the image recording material. The emitters are electrically energized selectively and for varying durations to expose and produce images in the image-recording material as it moves past the emitters.

The emitters may include light or heat emitting diodes or the ends of optical fibers each optically coupled at its other end with an actinic radiation source. The image-recording medium is carried on a sheet material and the system includes means for moving the image-recording sheet past the array of emitters and a processor for treating the exposed sheet to form a stable, visible image. A computer control system may include a memory containing programs for type characters thus offering the system utility as a high speed printer or it may provide for converting into printed form, electrical signals conveying graphic information.

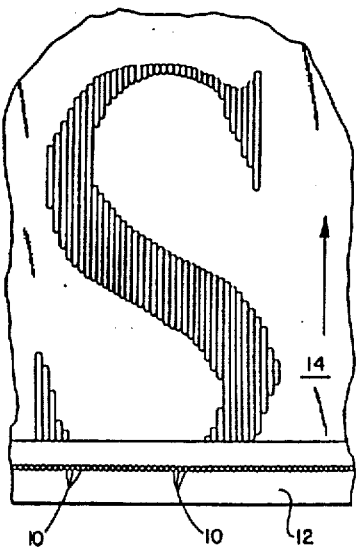

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

New claims 3-27 are added and determined to be patentable.

1. An electro-optical printing apparatus for printing *type quality* alpha-numeric characters *at high speed* on a surface of a photosensitive recording material, said apparatus comprising:
   a plurality of *rapidly reacting* radiation emitters each being capable of emitting radiation at wavelengths to which said surface is sensitive, said emitters being disposed in an array along a substantially straight line, said array being a plurality of rows of said radiation emitters;
   means for moving said recording material *in a single direction substantially perpendicular to said straight line* with its surface adjacent said array, and at a substantially constant speed relative to said array and;
   means for selectively activating each of said emitters for predetermined periods of time, and
   means for coordinating the predetermined period of time in which each of the said plurality of emitters are activated with said constant relative speed of said recording material so that the radiation emitted by said emitters will be recorded on selected areas of said recording surface in the form of an alipha-numeric image,
   each of said emitters being positioned to irradiate a different area of said recording surface, the different areas of said surface irradiated by each of the said emitters being arranged in an overlapping relationship with one another *and said plurality of emitters being of sufficient number to print said type quality alpha-numeric characters.*

2. A method of electro-optically printing *type quality* alpha-numeric characters *at high speed* on the recording surface of a photosensitive material, said method comprising the steps of:
   arranging a plurality of *rapidly reacting* radiation emitters in a straight line array, each of the said emitters being capable of emitting radiation at wavelengths to which said photosensitive material is sensitive,
   selectively energizing for predetermined periods of time each of the said emitters,
   transmitting the emitted radiation from each of the said emitters to a different area on said surface,
   providing relative movement *along a single coordinate substantially perpendicular to said array* at substantially constant speed between said recording surface and said emitters, and
   coordinating the predetermined periods of time in which each of said plurality of emitters [are] *is* selectively energized with said constant speed of said relative movement between said emitters and recording surface so that alpha-numeric character images are recorded on said recording surface by exposure of selected [ares] *areas* of said recording surface by said emitted radiation, said step of coordinating including the steps of synchronously generating a first data signal which programs the order [to] *of* energization of said emitters and a second data signal which determines the duration of the energization period of said emitters, and employing said first and second data signals to effect energization of said emitters so as to record said alpha-numeric character images *of said type quality at said high speed.*

3. *An electro-optical printing apparatus as recited in claim 1 wherein said predetermined periods of time have variable durations and each emitter when energized is arranged to expose said areas as substantially linear regions in the direction of movement of said recording material, with the linear regions having a length that is a function of the speed of the recording material and the duration of said predetermined periods of time of activation of the emitters.*

4. *An electro-optical printing apparatus as recited in claim 3 further comprising means for flashing said emitters a number of times along said linear regions.*

5. *An electro-optical printing apparatus as recited in claim 1 wherein said radiation emitters comprise light emitting diodes employed with optical means having entrance and exit ends arranged for receiving light from the light emitting diodes at the entrance ends and conveying that light to the exit ends.*

6. *An electro-optical printing apparatus as recited in claim 5 wherein said optical means comprises an elongated cylindrical lens.*

7. *An electro-optical printing apparatus as recited in claim 5 wherein said optical means comprises optic fibers.*

8. *An electro-optical printer apparatus as recited in claim 5 with said exit ends forming said plurality of rows.*

9. *An electro-optical printing apparatus as recited in claim 5 wherein said radiation emitters are disposed in a single row.*

10. *An electro-optical printing apparatus as recited in claim 1 further comprising said array of emitters positioned in an arrangement to print on the order of 300 said selected areas per inch along said straight line.*

11. *An electro-optical printing apparatus as defined in claim 1 wherein said means for moving said recording material at substantially constant speed consists of a feed roller system for moving the recording material relative to said array as the only moving apparatus required for moving said recording material relative to said array for printing the alpha-numeric characters.*

12. *An electro-optical printing apparatus as defined in claim 1 wherein said emitters comprise means having an emitting end for radiation and said means for moving said recording material surface adjacent said array locates the recording material closely adjacent to said emitting end for uniformly illuminating discrete areas of the surface with selectively activated emitters.*

13. *High speed electro-optical printing apparatus for printing alpha-numeric characters of type quality on a* surface of a photosensitive recording material, said apparatus comprising:
- a plurality of rapidly reacting radiation emitters each comprising at least one emitter end being capable of emitting radiation at wavelengths to which said surface is sensitive, said emitters being disposed in an array along a substantially straight line, said array being a plurality of rows of said ends of said radiation emitters;
- means for moving said recording material in a single direction with its surface closely adjacent said array to uniformly illuminate discrete areas with each emitter end and at a substantially constant speed relative to said array,
- means for selectively activating each of said emitters for predetermined periods of time, and
- means for coordinating the predetermined periods of time in which each of said plurality of emitters is activated with said constant relative speed of said recording material so that the radiation emitted by said ends of said emitters will be recorded on selected areas of said recording surface in the form of an alpha-numeric image,
- each of said emitter ends being positioned to irradiate a different area of said recording surface, the different areas of said surface irradiated by each of the said emitters being arranged in an overlapping relationship with one another.

14. An electro-optical printing apparatus for printing alpha-numeric type quality characters on a surface of a photosensitive recording material at high printing speeds, said apparatus comprising:
- a plurality of radiation emitters for printing areas at a resolution of approximately 300 areas per inch, each radiation emitter having an emitter end capable of emitting radiation at wavelengths to which said surface is sensitive, said emitters being disposed in an array along a substantially straight line, said array being a plurality of rows of said radiation emitters;
- means for moving said recording material with its surface closely adjacent said array to uniformly illuminate said areas and at a substantially constant speed relative to said array with motion along a single coordinate substantially perpendicular to said straight line,
- means for selectively activating each of the said emitters for predetermined periods of time, and
- means for coordinating the predetermined periods of time in which each of the said plurality of emitters is activated with said constant relative speed of said recording material so that the radiation emitted by said emitters will be recorded on selected areas of said recording surface in the form of an alpha-numeric image, said selected areas comprising linear regions, the lengths of which are determined by the predetermined periods of time in which said emitters are activated and said constant speed,
- each of said emitters being positioned to irradiate a different area of said recording surface, the different areas of said surface irradiated by each of the said emitters being arranged in an overlapping relationship with one another to eliminate gaps between adjacent ones of said linear regions when printing said alpha-numeric characters.

15. A method of electro-optically printing alpha-numeric characters on the recording surface of a photosensitive material as recited in claim 2 wherein the step of arranging said emitters includes a step of positioning each of said emitters closely adjacent to said recording surface to irradiate a different area of said recording surface with the different areas of said surface irradiated by each of said emitters being arranged in an overlapping relationship with one another.

16. The method of electro-optically printing type quality alpha-numeric characters on a photosensitive material as recited in claim 2 further comprising the step of:
- exposing by means of said second data signal linear regions of said recording surface to record a line length which is a function of the substantially constant linear speed of the recording surface and the duration of the energization period.

17. The method of electro-optically printing type quality alpha-numeric characters on the recording surface of a photosensitive material as recited in claim 2 further comprising the step of:
- disposing said plurality of radiation emitters in said array at a density for recording on the order of 300 of said selected areas per inch in a direction generally transverse to the direction of movement of said recording surface.

18. The method of electro-optically printing said type quality characters as defined in claim 2 further comprising the step of:
- exposing on said recording surface with said second data signals lines of different lengths by energization of different emitters thereby to form said type quality characters.

19. The method of claim 2 further comprising the step of:
- confining moving members required for providing the relative movement at substantially constant speed to a feed roller system for moving the recording surface during said energization periods of said emitters.

20. The method of electro-optically printing type quality alpha-numeric characters on the recording surface of said photosensitive material as defined in claim 2 further comprising the step of:
- producing lines of characters simultaneously on said recording surface substantially transverse to the relative movement by energizing selectively said emitters along the length of said straight line array with said first and second data signals.

21. The method of electro-optically printing type quality alpha-numeric characters as defined in claim 2 further comprising the steps of:
- providing light emitting diode radiation emitters in said array for emitting light radiation, and
- directing emitted light radiation from the diodes with light conducting means for conduction of light emitted from the diodes for emission at a location closely adjacent to the recording surface for exposure of said selected areas.

22. The method defined in claim 21 further comprising the steps of: receiving light from the diodes at entrance ends of said light conducting means, and arranging exit ends of the light conducting means adjacent the recording surface.

23. The method of claim 22 wherein the step of arranging includes the step of arranging said exit ends in a plurality of rows.

24. The method of claim 23 further comprising the step of arranging said light emitting diodes in a single row.

25. A method of electro-optically printing alpha-numeric characters of type quality at high speed on the recording surface of a photosensitive material, said method comprising the steps of:
- arranging a plurality of rapidly reacting radiation emitters in a straight line array extending generally in a first direction and in a sufficient number for simultaneously printing a plurality of type quality characters in a row extending along said first direction, each of the said emitters being capable of emitting radiation at wavelengths to which said photosensitive material is sensitive, selectively energizing for predetermined periods of time each of the said rapidly reacting emitters, transmitting the emitted radiation from each of said emitters to a different area on said surface, providing relative movement in a single direction at substantially constant speed between said recording surface and said emitters said single direction being substantially perpendicular to said first direction, and coordinating the predetermined periods of time in which each of said plurality of emitters is selectively energized with said constant speed of said relative movement betwen said emitters and recording surface so that alpha-numeric character images of type quality are recorded at said high speed on said recording surface by exposure of selected areas of said recording surface by said emitted radiation, said step of coordinating including the steps of synchronously generating a first data signal which programs the order to energize said emitters and a second data signal which determines the duration of the energization period of said emitters, and employing said first and second data signals to effect energization said emitters so as to record said type quality alpha-numeric character images at high speed.

26. A method of electro-optically printing alpha-numeric characters of type quality at high speed on the recording surface of a photosensitive material, said method comprising the steps of:

providing an arrangement of a plurality of radiation emitters in a straight line array extending generally in a direction X and in a sufficient number for simultaneously printing a plurality of type quality characters in a row extending along said X direction, each of the said emitters being capable of emitting radiation at wavelengths to which said photosensitive material is sensitive, selectively energizing for predetermined periods of time each of the said emitters, transmitting the emitted radiation from each of the said emitters to a different area on said surface, providing relative movement at substantially constant speed between said recording surface and said emitters said relative movement being limited to a direction Y which is substantially perpendicular to said X direction, and coordinating the predetermined periods of time in which each of said plurality of emitters is selectively energized with said constant speed of said relative movement between said emitters and recording surface so that alpha-numeric character images of type quality are recorded on said recording surface by exposure of selected areas of said recording surface by said emitted radiation, said step of coordinating including the steps of synchronously generating a first data signal which programs the order for energization of said emitters and a second data signal which determines the duration of the energization period of said emitters for recording along said Y direction, and employing said first and second data signals to effect energization of said emitters so as to record said alpha-numeric character images.

27. A method of electro-optically printing alpha-numeric characters on the recording surface of a photosensitive material as recited in claim 2 wherein said step in which the emitters are selectively energized includes the step of strobing said emitters during the duration of the energization period.

* * * * *